United States Patent [19]

Shachi et al.

[11] Patent Number: 5,753,755
[45] Date of Patent: May 19, 1998

US005753755A

[54] RESIN COMPOSITION AND MOLDED ARTICLE OF THE SAME

[75] Inventors: Kenji Shachi; Kazushige Ishiura, both of Tsukuba, Japan

[73] Assignee: Kuraray Co., Ltd., Kurashiki, Japan

[21] Appl. No.: 697,126

[22] Filed: Aug. 20, 1996

[30] Foreign Application Priority Data

Aug. 28, 1995 [JP] Japan .................... 7-242500

[51] Int. Cl.$^6$ .................... C08L 53/00
[52] U.S. Cl. .................... 525/95
[58] Field of Search .................... 525/95

[56] References Cited

U.S. PATENT DOCUMENTS

| 5,276,094 | 1/1994 | Kaszas et al. | 525/95 |
| 5,334,657 | 8/1994 | Swartzmiller et al. | 525/95 |
| 5,475,060 | 12/1995 | Brekner et al. | 525/95 |

FOREIGN PATENT DOCUMENTS

| 0 358 516 | 3/1990 | European Pat. Off. |  |
| 0 436 372 A2 | 7/1991 | European Pat. Off. |  |
| 0 559 146 | 9/1993 | European Pat. Off. |  |
| 0 572 667 A1 | 12/1993 | European Pat. Off. |  |
| 58-206644 | 12/1983 | Japan | 525/95 |
| 58-223648 | 12/1983 | Japan | 525/95 |
| 59-53548 | 3/1984 | Japan | 525/95 |
| 60-1248 | 1/1985 | Japan | 525/95 |
| 06100736 | 4/1994 | Japan | 525/95 |
| 6100740 | 4/1994 | Japan | 525/95 |
| WO 93/23448 | 11/1993 | WIPO |  |

OTHER PUBLICATIONS

Hawley's Condensed Chemical Dictionary 1991 p. 944.

*Primary Examiner*—Joseph L. Schoffer
*Assistant Examiner*—N. Sarofim
*Attorney, Agent, or Firm*—Oblon, Spivak, McClelland, Maier & Neustadt, P.C.

[57] ABSTRACT

A resin composition containing (A) an amorphous polyolefin resin and (B) a block copolymer comprising a polymer block of an aromatic vinyl compound and an isobutylene polymer block, at an (A)/(B) weight ratio within a range of 95/5 to 50/50, has remarkably improved impact resistance, with no deterioration of the excellent properties essential to the amorphous polyolefin resin (A), such as transparency.

6 Claims, No Drawings

RESIN COMPOSITION AND MOLDED ARTICLE OF THE SAME

BACKGROUND OF THE INVENTION

1. Field of the Invention

The present invention relates to a resin composition containing an amorphous polyolefin resin and a specific block copolymer, and a molded article comprising the resin composition.

Because the resin composition of the present invention has excellent impact resistance and transparency and additionally because the composition has good gas barrier properties, the composition is useful as a plastic for film, sheet, container (bottle, etc.), tray and the like. The molded articles comprising the resin composition can effectively exhibit such excellent performance.

2. Related Art of the Invention

Recent attention has been focused on amorphous polyolefin resins, such as copolymer of ethylene and a cyclic olefin (for example, addition copolymer of a norbornene monomer and ethylene) and a polymer prepared by ring-opening polymerization of a norbornene monomer and subsequent hydrogenation, as a plastic with good transparency and the like. For example, the specification of European Patent Application 358,516, the specification of European Patent Application 436,372, and Japanese Patent Application Laid-open No. Hei 3-252446 describe with respect to these resins that the resins have excellent transparency as well as good water resistance, chemical resistance and solvent resistance from their origin as one of polyolefins, and that the resins have superior thermal resistance because of their higher glass transition temperatures.

However, these resins are more fragile than polyethylene, polypropylene, polycarbonate resins and the like, so when the resins are prepared into molded articles such as sheet and film, the articles are extremely readily broken, disadvantageously. As a method for overcoming such disadvantage, Japanese Patent Application Laid-open No. Hei 3-12448 proposes a method for plasticizing a copolymer of ethylene and a cyclic olefin by adding a softening agent such as hydrocarbon resin to the copolymer. Furthermore, Japanese Patent Application Laid-open No. Hei 3-72558 describes with respect to a thermoplastic resin composition comprising a polymer prepared by ring-opening polymerization of norbornenes and subsequent hydrogenation and a rubber polymer that a resin composition with both of superior impact resistance and transparency can be produced when using as the rubber polymer, a hydrogenated block copolymer containing a specific ratio of a polymer block of an aromatic vinyl compound, a polybutadiene block at a 1,2-vinyl bond content of 30% to 70% by weight and a polybutadiene block at a 1,2-vinyl bond content of less than 30% by weight, or a hydrogenated block copolymer containing a specific ratio of a polymer block of an aromatic vinyl compound, a random copolymer block of an aromatic vinyl compound and a conjugated diene compound, and a taper copolymer block of an aromatic vinyl compound and a conjugated diene compound.

When a softening agent such as hydrocarbon resin is added to an amorphous polyolefin resin as described in the Japanese Patent Application Laid-open No. Hei 3-12448, the softening agent may bleed out from the resulting molded article to cause stain deposition, so such method is not satisfactory in practical sense as the method for improving the impact resistance.

Additionally, the Japanese Patent Application Laid-open No. Hei 3-72558 describes that a resin composition with both of good impact resistance and transparency can be produced by blending a certain rubber polymer into an amorphous polyolefin resin, but those rubber polymers described therein, which can make impact resistance and transparency compatible, are limited to block copolymers of a specific structure comprising an aromatic vinyl compound and a conjugated diene compound. From such respect, it is indicated that the compatibility of impact resistance and transparency is a problem extremely difficult to be achieved.

Alternatively, the specification of European Patent Application Publication No. 572,667 describes that the impact resistance of a crystalline polyolefin resin such as polypropylene can be improved by blending 100 parts by weight of the crystalline polyolefin resin with 0.5 to 35 parts by weight of a block copolymer comprising a polymer block of an aromatic vinyl compound and an isobutylene polymer block, but the specification describes neither the blending of the block copolymer into an amorphous polyolefin resin nor the extent of the resulting transparency in such case.

SUMMARY OF THE INVENTION

It is a first object of the present invention to provide a novel resin composition of amorphous polyolefin resins, with highly improved impact resistance but without deterioration of the excellent essential properties of amorphous polyolefin resins as a plastic, such as transparency, with no necessity of use of high bleed-out additives such as hydrocarbon resins.

It is a second object of the present invention to provide a novel molded article capable of effectively exerting the advantages described above.

So as to overcome the problems described above, the present inventors have made investigations. Consequently, the inventors have found that transparency and impact resistance is compatible when a specific polymer is blended into an amorphous polyolefin resin. Thus, the invention has been achieved.

In accordance with the present invention, the first object can be achieved by providing a resin composition containing (A) an amorphous polyolefin resin and (B) a block copolymer comprising a polymer block of an aromatic vinyl compound and an isobutylene polymer block, at an (A)/(B) weight ratio within a range of 95/5 to 50/50.

In accordance with the present invention, furthermore, the second object can be achieved by providing a molded article comprising the resin composition described above.

DETAILED DESCRIPTION OF THE INVENTION

The present invention will now be described in detail hereinbelow.

As the amorphous polyolefin resin (A) in accordance with the present invention, use may be made of a variety of polyolefin resins provided that the resins are amorphous (that is, the resins have a nature such that the melting points thereof substantially cannot be measured by DSC). From the respect of remarkable exertion of the effect of improving the impact resistance derived from the blending of the block copolymer (B), among them, preference is given to the addition copolymer (A-1) comprising both of ethylene monomer and a cyclic olefin or comprising both of them and an α-olefin, or the polymer prepared by ring-opening polymerization of a cyclic olefin and subsequent hydrogenation (A-2). The number average molecular weight or intrinsic viscosity of the amorphous polyolefin resin (A) may be selected appropriately, depending on the object and the like, with no specific limitation; generally, the number average molecular weight thereof is preferably within a range of 10,000 to 500,000 or the intrinsic viscosity measured in decalin at 135° C. is preferably within a range of 0.01 to 20 dl/g.

The process of producing the addition copolymer (A-1) described above is with no specific limitation; as such method, a variety of known methods may be used. The addition copolymer (A-1) can be produced, for example, by copolymerizing together ethylene and a cyclic olefin or by copolymerizing an α-olefin with them, in a liquid phase. The copolymerization in the liquid phase may be carried out, for example, in a hydrocarbon solvent such as cyclohexane, in the presence of a catalyst of a soluble vanadium compound and an organic aluminium compound, at a temperature within a range of −50° C. to 100° C. and a pressure within a range of 0 to 50 kg/cm$^2$G. Furthermore, the cyclic olefin includes for example norbornenes such as bicyclo[2.2.1]-2-heptene, 5-methylbicyclo[2.2.1]-2-heptene, 5,6-dimethylbicyclo[2.2.1]-2-heptene, tetracyclo[4.4.0.1$^{2,5}$.1$^{7,10}$]-3-dodecene, 8-methyltetracyclo[4.4.0.1$^{2,5}$.1$^{7,10}$]-3-dodecene, and 8,9-dimethyltetracyclo[4.4.0.1$^{2,5}$.1$^{7,10}$]-3-dodecene. The α-olefin includes for example α-olefins with 3 to 20 carbon atoms, such as propylene, 1-butene, 4-methyl-1-pentene, 1-hexene, 1-octene, 1-decene, 1-dodecene, 1-tetradecene, 1-hexadecene, 1-octadecene, and 1-eicosene.

Additionally, the process of producing the hydrogenated product (A-2) described above is with no specific limitation; a variety of known processes may be used. The hydrogenated product (A-2) may be produced by the ring-opening polymerization of a cyclic olefin and subsequent hydrogen addition to a part of the olefinic unsaturated bond of the resulting polymer. The ring-opening polymerization may be carried out, for example, by treating a cyclic olefin, in the presence of a catalyst of a transition metal compound or a platinum-group metal compound and an organic metal compound such as an organic aluminium compound, and in the presence of an additive such as a tertiary aliphatic or aromatic amine and the like, if necessary, at a temperature within a range of −20° C. to 100° C. and a pressure within a range of 0 to 50 kg/cm$^2$G. Furthermore, the hydrogenation may be carried out in the presence of a general hydrogenation catalyst. Furthermore, the cyclic olefin includes for example norbornenes such as bicyclo[2.2.1]-2-heptene, 5-methylbicyclo[2.2.1]-2-heptene, 5,6-dimethylbicyclo[2.2.1]-2-heptene, 5-carboxymethylbicyclo[2.2.1]-2-heptene, dicyclopentadiene, 2,3-dihydrodicyclopentadiene, tetracyclo[4.4.0.1$^{2,5}$.1$^{7,10}$]-3-dodecene, 8-methyltetracyclo[4.4.0.1$^{2,5}$.1$^{7,10}$]-3-dodecene, 8-ethyltetracyclo[4.4.0.1$^{2,5}$.1$^{7,10}$]-3-dodecene, 8-carboxymethyltetracyclo[4.4.0.1$^{2,5}$.1$^{7,10}$]-3-dodecene, and 8-methyl-8-carboxymethyltetracyclo[4.4.0.1$^{2,5}$.1$^{7,10}$]-3-dodecene.

As the block copolymer (B), use may be made of a block copolymer containing a polymer block of an aromatic vinyl compound and an isobutylene polymer block in accordance with the present invention. The polymer block of an aromatic vinyl compound primarily comprises the aromatic vinyl compound. The aromatic vinyl compound includes styrene, α-methylstyrene, β-methylstyrene, p-methylstyrene, t-butylstyrene, 2,4,6-trimethylstyrene, monofluorostyrene, difluorostyrene, monochlorostyrene, dichlorostyrene, methoxystyrene, indene, and acenaphthylene. The isobutylene polymer block primarily comprises isobutylene. The weight ratio of the aromatic vinyl compound and isobutylene in the block copolymer (B) may be selected appropriately, depending on the object, generally within a range of 5/95 to 80/20 as the aromatic vinyl compound/isobutylene ratio. For the higher effect of improving impact resistance, preference is given to a range of 10/90 to 70/30. Other than the aromatic vinyl compound and isobutylene, another monomer may be copolymerized in the block copolymer (B) within a range with no deterioration of the advantages of the present invention. The monomer includes for example cationic-polymerizable monomers such as 1-butene, pentene, hexene, butadiene, isoprene, and methyl vinyl ether.

As the block copolymer (B), preference is given to a triblock copolymer of a block structure comprising an aromatic vinyl compound polymer block-an isobutylene polymer block-an aromatic vinyl compound polymer block.

The number average molecular weight of the block copolymer (B) is preferably within a range of 5,000 to 400,000. When the number average molecular weight of the copolymer is 5,000 or more, the effect of suppressing bleed out from the resin composition produced by mixing the copolymer with an amorphous polyolefin resin is particularly significant.

Still additionally, the block copolymer (B) may contain halogen atoms such as chlorine atom, functional groups such as carboxyl group, hydroxyl group, and an acid anhydride residue, on an intermediate position of the molecular chain or at the terminus of the chain.

The process of producing the block copolymer (B) is with no specific limitation; a variety of known processes may be used. For example, the block copolymer (B) may be produced by stepwise facilitating the polymerization of monomers primarily comprising an aromatic vinyl compound and the polymerization of monomers primarily comprising isobutylene, in an appropriate sequence and at an appropriate number of times, in an inactive solvent such as hexane and methylene chloride, in the presence of an initiator comprising a Louis acid and an organic compound capable of forming a species active to cationic polymerization with the acid, and in the co-existence of an additive such as a pyridine derivative and amides, if necessary. The Louis acid includes for example titanium tetrachloride, boron trichloride, aluminium chloride, and stannic tetrachloride. The organic compound capable of forming a species active to cationic polymerization includes organic compounds with functional groups such as alkoxy group, acyloxy group and halogen atom, for example, bis(2-methoxy-2-propyl) benzene, bis(2-acetoxy-2-propyl)benzene, and bis(2-chloro-2-propyl)benzene. Furthermore, the amides described above include for example dimethylacetamide and dimethylformamide.

The triblock copolymer of a structure comprising an aromatic vinyl compound polymer block-an isobutylene polymer block-an aromatic vinyl compound polymer block, may be produced by firstly adding monomers primarily comprising an aromatic vinyl compound into a polymerization system for polymerization using an organic compound with one functional group and a Louis acid as the initiator system, adding monomers primarily comprising isobutylene to the polymerization system for polymerization after substantial termination of the polymerization described above, and subsequently adding again monomers primarily comprising an aromatic vinyl compound into the polymerization system after substantial termination of the polymerization described immediately above. Further, the triblock copolymer may also be produced, by polymerizing monomers primarily comprising isobutylene using an organic compound with two functional groups and a Louis acid, and subsequently after substantial termination of the polymerization, adding monomers primarily comprising an aromatic vinyl compound into the polymerization system for polymerization.

The resin composition of the present invention contains the amorphous polyolefin resin (A) and the block copolymer (B) at an (A)/(B) weight ratio within a range of 95/5 to 50/50. If the weight ratio of (A)/(B) is larger than 95/5, the impact resistance of the resulting resin composition is so insufficient that the resulting molded article thereof gets fragile; if the (A)/(B) weight ratio is smaller than 50/50, the elastic modulus of the resulting resin composition is lowered, leading to the deterioration of the performance thereof as a plastic. From the standpoint of marked excellence in both the impact resistance and elastic modulus, in particular, the (A)/(B) weight ratio is preferably within a range of 90/10 to 60/40.

Within a range with no substantial deterioration of the advantages of the present invention, the resin composition of the invention may contain components other than the amorphous polyolefin resin (A) and the block copolymer (B). Such components include, for example, polymer components such as a block copolymer of a structure of styrene-ethylene/propylene-styrene, a block copolymer of a structure of styrene-ethylene/propylene, a block copolymer of a structure of styrene-ethylene/butylene-styrene, ethylene/propylene rubber (EPR, EPDM), polybutene, polyisobutylene, and methacrylate-butadiene-styrene copolymer (MBS); softening agents of mineral oils, such as paraffin oil and naphthene oil; inorganic fillers; inorganic fibrous materials; organic fibrous materials; thermal stabilizers; antioxidants; light stabilizers; fire retardants; tackifiers; antistatic agents; and foaming agents.

Furthermore, the addition of softening agents of mineral oils may sometimes be effective for improving processability during molding or for providing flexibility to the molded articles. Additionally, the blending of inorganic fillers, inorganic fibrous materials or organic fibrous materials may sometimes be effective for improving the heat resistance or weatherability of the resin composition or for increasing the volume of the resin composition.

The process of producing the resin composition of the present invention is with no specific limitation; any process according to known processes of producing resin compositions may be adopted. For example, the resin composition of the present invention may be produced by kneading together given amounts of the amorphous polyolefin resin (A) and the block copolymer (B) under heating and melting conditions, by using a kneader or a mixer, such as single-screw extruder, double-screw extruder, Banbury mixer, Henschel mixer, and kneader.

By molding or forming processes such as extrusion, injection molding, vacuum forming, air-pressure forming and blow molding, the resin composition of the present invention can be molded or formed appropriately into a given desirable shape of molded articles. The molded articles comprising the resin composition of the present invention include sheet or film, container (bottle, etc.), tray and the like.

In accordance with the present invention, the impact resistance of the amorphous polyolefin resin (A) is remarkably improved by blending a specific block copolymer (B) with the amorphous polyolefin resin (A) of itself, with almost no deterioration of the excellent performance essential to the amorphous polyolefin resin (A) as a plastic, such as transparency and gas barrier properties. Thus, a resin composition and a molded article can be provided, having higher impact resistance and greater transparency both compatible therein and also having good gas barrier properties. As to the transparency of the resin composition in accordance with the present invention, furthermore, a rectangle sheet of a size of 75 mm (long side)×45 mm (short side)×1 mm (thickness) was prepared from the composition by compression molding, and the Haze value thereof was measured according to JIS K 7105, which is generally 20 or less.

The present invention will be described more specifically in examples below, but the invention is not limited to these examples. In the examples, the term "part(s)" means "part(s) by weight".

The performance of the resin composition was assessed by the following methods.

(a) Impact resistance

Izod impact strength was measured at 23° C. according to ASTM D 256 (with ¼ notch).

(b) Transparency

By compression molding, a rectangle sheet of a size of 75 mm (long side)×45 mm (short side)×1 mm (thickness) was prepared; and its Haze value was measured with a digital Haze computer (Type HGM-2DP; manufactured by Suga Test Instruments, Co. Ltd.) according to JIS K 7105.

The transparency of the sheet was evaluated visually under observation; the results are grouped into three grades as follows; transparent (○), slightly hazing (Δ) and opaque (x).

(c) Oxygen permeability coefficient ($P_{O_2}$)

By compression molding, a film of a 20-μm thickness was prepared; the oxygen permeability coefficient of the film was measured with a gas permeation measurement system (Type GTR-10; manufactured by Yanagimoto Mfg. Co., Ltd.) according to ASTM D3985.

SYNTHESIS EXAMPLE 1

Addition copolymerization reaction was carried out, by continuously feeding ethylene and a cyclic olefin, tetracyclo [$4.4.0.1^{2,5}.1^{7,10}$]-3-dodecene, in cyclohexane solvent into which were preliminarily added $VO(OC_2H_5)Cl_2$ (polymerization catalyst) and ethyl aluminium sesquichloride (cocatalyst) at an Al/V molar ratio of 8.0, in an agitation-type polymerization reactor. The polymerization temperature and polymerization pressure were retained at 11° C. and 1.8 kg/cm²G, respectively, during the reaction. In such manner, an ethylene-cyclic olefin random copolymer (a-1) of an ethylene content of 51 mol % and an intrinsic viscosity [η] of 0.95 dl/g in decalin at 135° C., was recovered.

The temperature of the resulting ethylene-cyclic olefin random copolymer (a-1) was elevated at a rate of 10° C./min from room temperature to 200° C. with a differential scanning calorimeter (DSC) (Type TA4000; manufactured by Mettler Instrumente). Then, after retaining the copolymer at 200° C. for 10 minutes and subsequently rapidly cooling the copolymer down to room temperature, the copolymer was again kept under the conditions of temperature elevation of 10° C./min to observe the presence or absence of any melting point within a temperature range up to 300° C. However, no melting point was substantially observed.

SYNTHESIS EXAMPLE 2

Except for the use of 8,9-dimethyltetracyclo[$4.4.0.1^{2,5}.1^{7,10}$]-3-dodecene as a cyclic olefin, the same procedures as in Synthesis Example 1 were followed to generate an ethylene-cyclic olefin random copolymer (a-2) of an ethylene content of 82 mol % and an intrinsic viscosity [η] of 0.35 dl/g in decalin at 135° C. Following the same manner as in Synthesis Example 1, the resulting ethylene-cyclic olefin random copolymer (a-2) was observed as to whether or not the copolymer had any melting point. However, no melting point was observed substantially.

SYNTHESIS EXAMPLE 3

Except for the use of 8-methyltetracyclo[4.4.0.1$^{2,5}$.1$^{7,10}$]-3-dodecene as a cyclic olefin, the same procedures as in Synthesis Example 1 were followed, to produce an ethylene-cyclic olefin random copolymer (a-3) of an ethylene content of 36 mol % and an intrinsic viscosity [η] of 1.28 dl/g in decalin at 135° C. Following the same manner as in Synthesis Example 1, the resulting ethylene-cyclic olefin random copolymer (a-3) was observed as to whether or not the copolymer had any melting point. However, no melting point was observed substantially.

SYNTHESIS EXAMPLE 4

In an agitation-type polymerization reactor were charged 90 parts of toluene, 0.5 part of triethylaluminium, 1.4 parts of triethylamine, and 0.08 part of 1-hexene. While continuously adding 30 parts of 8-ethyltetracyclo[4.4.0.1$^{2,5}$.1$^{7,10}$]-3-dodecene and 0.17 part of titanium tetrachloride into the reaction system over one hour while keeping the temperature at 20° C., ring-opening polymerization was initiated. After the termination of addition, the polymerization was continued for another one hour.

The polymer prepared by ring-opening polymerization was dissolved in 200 parts of cyclohexane, which was then charged along with 0.6 part of palladium/carbon catalyst (palladium was immobilized at 5% by weight on carbon) in an autoclave, for promoting hydrogenation at a hydrogen pressure of 70 kg/cm$^2$ and a temperature of 140° C. for 4 hours.

Thus, a polymer (a-4) of a hydrogenation ratio of 99% or more, a number average molecular weight (Mn) of 7,200, a weight average molecular weight (Mw) of 185,000 and a molecular weight distribution (Mw/Mn) of 2.5, was recovered; the molecular weights and the distribution were determined by GPC. Following the same manner as in Synthesis Example 1, the resulting polymer (a-4) was observed as to whether or not the polymer had any melting point. However, no melting point was observed substantially.

SYNTHESIS EXAMPLE 5

In an agitation-type polymerization reactor were charged 500 parts of 8-carboxymethyltetracyclo[4.4.0.1$^{2,5}$.1$^{7,10}$]-3-dodecene, 2,500 parts of 1,2-dichloroethane, 3.8 parts of 1-hexene as a molecular weight adjuster, 101 parts of a 0.05 mol/liter solution of tungsten hexachloride in chlorobenzene as a catalyst, 86 parts of a 0.1 mol/liter solution of paraldehyde in 1,2-dichloroethane, and 32 parts of a 0.5 mol/liter solution of triisobutylaluminium in toluene, for 10-hr reaction at 60° C. In such manner, a polymer by ring-opening polymerization with an intrinsic viscosity [η] of 0.75 dl/g in chloroform at 30° C., was recovered. The polymer was dissolved in 8,000 parts of tetrahydrofuran, followed by addition of 45 parts of a palladium-alumina catalyst at a palladium concentration of 5% by weight (sometimes abbreviated as "wt %" hereinafter), which was then hydrogenated at 150° C. for 5 hours under the condition of a hydrogen pressure of 100 kg/cm$^2$.

In such fashion, a polymer (a-5) of a hydrogenation ratio of 99% or more was recovered. Following the same manner as in Synthesis Example 1, the resulting polymer (a-5) was observed as to whether or not the polymer had any melting point. However, no melting point was observed substantially.

SYNTHESIS EXAMPLE 6

In an agitation-type polymerization reactor were charged 20 mg of isopropylidene(cyclopentadienyl)(1-indenyl)zirconium dichloride, 500 ml of a 10 wt % solution of methylaluminoxane in toluene, 300 ml of a 20 wt % solution of triisobutylaluminium in toluene and 20 kg of norbornene, for addition copolymerization of norbornene and ethylene under the conditions of an ethylene pressure of 18 kg/cm$^2$ and a temperature of 70° C. In such manner, an ethylene-cyclic olefin random copolymer (a-6) with an intrinsic viscosity [η] of 0.51 dl/g in decalin at 135° C., was recovered. The resulting copolymer (a-6) was observed as to whether or not the copolymer had any melting point, in the same manner as in the Synthesis Example 1. No melting point was observed substantially.

SYNTHESIS EXAMPLE 7

In a reactor with an agitator were charged 1,060 parts of methylene chloride dehydrated and purified through Molecular Sieves 4A and 924 parts of methylcyclohexane dehydrated and purified in the same manner, followed by individual addition of 2.0 parts of 1,4-bis(2-chloro-2-propyl)benzene, 0.98 part of 2,6-dimethylpyridine, 1.38 parts of pyridine and 210 parts of isobutylene. Into the mixture solution were added 12.3 parts of titanium tetrachloride at −78° C., for initiating the polymerization and continuing the polymerization at the same temperature for 3 hours, followed by addition of 0.5 part of 2,6-dimethylpyridine and 90 parts of styrene for the polymerization for another 2 hours, to recover a polystyrene-polyisobutylene-polystyrene triblock copolymer (b-1).

The number average molecular weight (Mn) of the resulting block copolymer was 34,000; the molecular weight distribution (Mw/Mn) thereof was 1.23; and the polystyrene content thereof was 30% by weight.

SYNTHESIS EXAMPLE 8

In a reactor with an agitator were charged 1,060 parts of methylene chloride dehydrated and purified through Molecular Sieves 4A and 924 parts of methylcyclohexane dehydrated and purified in the same manner, followed by individual addition of 1.0 part of 1,4-bis(2-chloro-2-propyl)benzene, 1.74 parts of 2,6-di-t-dimethylpyridine, 0.68 part of pyridine and 210 parts of isobutylene. Into the mixture solution were added 12.3 parts of titanium tetrachloride at −78° C., for initiating the polymerization and continuing the polymerization for 4 hours, followed by addition of 0.90 part of 2,6-di-t-butylpyridine and 52.5 parts of styrene for the polymerization for another 4 hours, to recover a polystyrene-polyisobutylene-polystyrene triblock copolymer (b-2).

The number average molecular weight (Mn) of the resulting block copolymer was 75,000; the molecular weight distribution (Mw/Mn) thereof was 1.20; and the polystyrene content thereof was 30% by weight.

SYNTHESIS EXAMPLE 9

In a reactor with an agitator were charged 1,060 parts of methylene chloride dehydrated and purified through Molecular Sieves 4A and 924 parts of methylcyclohexane dehydrated and purified in the same manner, followed by individual addition of 0.5 part of 1,4-bis(2-chloro-2-propyl) benzene, 0.98 part of 2,6-dimethylpyridine, 0.34 part of pyridine and 210 parts of isobutylene. Into the mixture solution were added 12.3 parts of titanium tetrachloride at −78° C., for initiating the polymerization and continuing the polymerization at the same temperature for 4 hours, followed by addition of 0.5 part of 2,6-dimethylpyridine and 140 parts of styrene for the polymerization for another 4 hours, to recover a polystyrene-polyisobutylene-polystyrene triblock copolymer (b-3).

The number average molecular weight (Mn) of the resulting block copolymer was 170,000; the molecular weight distribution (Mw/Mn) thereof was 1.20; and the polystyrene content thereof was 40% by weight.

EXAMPLE 1

The ethylene-cyclic olefin random copolymer (a-1) produced in Synthesis Example 1 and the block copolymer (b-1) produced in Synthesis Example 7, at a weight ratio of 90/10, were melt and kneaded together under the conditions of 230° C. and 100 rpm for 3 minutes, using a plastograph (Type PL-3000; manufactured by Brabender Corporation, to recover a resin composition.

By compression molding the resulting resin composition at 230° C., a press sheet of a 1-mm thickness and a film of a 20-μm thickness, were individually prepared. By injection molding the resin composition at 230° C., test pieces of a thickness of 4 mm were prepared for determining the Izod impact strength.

The results of the assessment of the resin composition are shown in Table 1.

EXAMPLES 2 to 13

Except for the modification of the types of the structural components and the blending ratios as shown in Table 1 below, resin compositions were prepared in the same manner as in Example 1. Sheets, test pieces and films were prepared from the resin compositions. In some of the Examples, furthermore, use was made of a copolymer produced by addition copolymerization of tetracyclododecene with ethylene in the presence of $VO(OC_2H_5)Cl_2$ [APEL 6015 manufactured by Mitsui Petrochemical Industries, Ltd.] as an amorphous polyolefin resin (the copolymer is shown as "a-7" hereinbelow).

The results of the assessment of the resin compositions are shown in Table 1.

COMPARATIVE EXAMPLES 1 to 7

As shown in Table 1, sheets, test pieces and films were prepared by using amorphous polyolefin resins (a-1) to (a-7) singly.

The results of the assessment of the amorphous polyolefin resins alone are shown in Table 1.

TABLE 1

|  | Example 1 | Example 2 | Comparative Example 1 | Example 3 | Example 4 |
|---|---|---|---|---|---|
| Amorphous polyolefin resin |  |  |  |  |  |
| Type | (a-1) | (a-1) | (a-1) | (a-2) | (a-2) |
| Blend ratio (part(s) by weight) | 90 | 70 | 100 | 90 | 80 |
| Triblock copolymer |  |  |  |  |  |
| Type | (b-1) | (b-1) | — | (b-2) | (b-2) |
| Blend ratio (part(s) by weight) | 10 | 30 | 0 | 10 | 20 |
| Assessment of resin composition |  |  |  |  |  |
| Izod impact strength (kg · cm/cm) | 6.9 | 9.5 | 3.0 | 10.3 | 60.3 |
| Transparency: Haze (%) | 7.1 | 15.0 | 1.9 | 6.8 | 13.2 |
| Determined visually | ○ | ○ | ○ | ○ | ○ |
| Oxygen permeability coefficient ($Po_2$) (cc · 20 μm/m² · day · atm) | 2300 | 5600 | 1300 | — | — |

|  | Comparative Example 2 | Example 5 | Example 6 | Comparative Example 3 | Example 7 |
|---|---|---|---|---|---|
| Amorphous polyolefin resin |  |  |  |  |  |
| Type | (a-2) | (a-3) | (a-3) | (a-3) | (a-4) |
| Blend ratio (part(s) by weight) | 100 | 90 | 70 | 100 | 90 |
| Triblock copolymer |  |  |  |  |  |
| Type | — | (b-2) | (b-2) | — | (b-1) |
| Blend ratio (part(s) by weight) | 0 | 10 | 30 | 0 | 10 |
| Assessment of resin composition |  |  |  |  |  |
| Izod impact strength (kg · cm/cm) | 3.1 | 14.2 | 58.8 | 3.1 | 6.8 |
| Transparency: Haze (%) | 1.4 | 2.5 | 10.3 | 0.9 | 8.2 |
| Determined visually | ○ | ○ | ○ | ○ | ○ |
| Oxygen permeability coefficient ($Po_2$) (cc · 20 μm/m² · day · atm) | — | 2500 | 4500 | — | — |

TABLE 1-continued

|  | Comparative Example 4 | Example 8 | Comparative Example 5 | Example 9 | Example 10 |
|---|---|---|---|---|---|
| Amorphous polyolefin resin | | | | | |
| Type | (a-4) | (a-5) | (a-5) | (a-2) | (a-2) |
| Blend ratio (part(s) by weight) | 100 | 90 | 100 | 90 | 80 |
| Triblock copolymer | | | | | |
| Type | — | (b-2) | — | (b-3) | (b-3) |
| Blend ratio (part(s) by weight) | 0 | 10 | 0 | 10 | 20 |
| Assesment of resin composition | | | | | |
| Izod impact strength (kg · cm/cm) | 2.1 | 10.1 | 3.1 | 15.8 | 41.2 |
| Transparency: Haze (%) | 1.4 | 8.5 | 1.8 | 2.5 | 2.8 |
| Determined visually | ○ | ○ | ○ | ○ | ○ |
| Oxygen permeability coefficient ($Po_2$) (cc · 20 μm/$m^2$ · day · atm) | — | — | — | 2800 | 3500 |

|  | Example 11 | Comparative Example 6 | Example 12 | Example 13 | Comparative Example 7 |
|---|---|---|---|---|---|
| Amorphous polyolefin resin | | | | | |
| Type | (a-6) | (a-6) | (a-7) | (a-7) | (a-7) |
| Blend ratio (part(s) by weight) | 80 | 100 | 90 | 70 | 100 |
| Triblock copolymer | | | | | |
| Type | (b-2) | — | (b-1) | (b-1) | — |
| Blend ratio (part(s) by weight) | 20 | 0 | 10 | 30 | 0 |
| Assessment of resin composition | | | | | |
| Izod impact strength (kg · cm/cm) | 7.9 | 1.9 | 6.5 | 13.0 | 2.5 |
| Transparency: Haze (%) | 12.3 | 3.0 | 8.0 | 14.0 | 4.0 |
| Determined visually | ○ | ○ | ○ | ○ | ○ |
| Oxygen permeability coefficient ($Po_2$) (cc · 20 μm/$m^2$ · day · atm) | — | — | 2700 | 4600 | 1800 |

COMPARATIVE EXAMPLES 8 and 9

Except for the use of a polystyrene-polyethylene/propylene-polystyrene triblock copolymer (c-1) [number average molecular weight (Mn)=45,000; Mw/Mn=1.13; polystyrene content=30% by weight] in place of the polystyrene-polyisobutylene-polystyrene triblock copolymer, the same method was used as in the Examples, for kneading the copolymer with an amorphous polyolefin resin (a-1) or (a-2) at a ratio shown in Table 2 below. Additionally, sheets, test pieces and films were prepared from the resulting resin compositions.

The results of the assessment of the resin compositions are shown in Table 2.

TABLE 2

|  | Comparative Example 8 | Comparative Example 9 |
|---|---|---|
| Amorphous polyolefin resin | | |
| Type | (a-1) | (a-2) |
| Blend ratio (part(s) by weight) | 80 | 80 |
| Triblock copolymer | | |
| Type | (c-1) | (c-1) |
| Blend ratio (part(s) by weight) | 20 | 20 |
| Assessment of resin composition | | |
| Izod impact strength | 5 | 3.8 |
| (kg · cm/cm) | | |
| Transparency: Haze (%) | 42.5 | 45.3 |
| Determined visually | × | × |
| Oxygen permeability coefficient ($Po_2$) (cc · 20 μm/$m^2$ · day · atm) | 46000 | 48000 |

The results in Tables 1 and 2 indicate that the resin compositions of the present invention (Examples 1 to 13) have higher impact resistance and good transparency, together with excellent oxygen barrier properties. On contrast, it is indicated that the amorphous polyolefin resins alone (Comparative Examples 1 to 7) have relatively lower impact resistance. The resin compositions (Comparative Examples 8 and 9), different from those of the present invention, in that the block copolymer blended into the amorphous polyolefin resins is not the block copolymer (B), have not satisfactorily improved impact resistance, and deteriorate distinctively excellent transparency and good oxygen barrier properties essential to the amorphous polyolefin resins.

What is claimed is:

1. A resin composition containing (A) an amorphous polyolefin resin and (B) a block copolymer comprising a polymer block of an aromatic vinyl compound and an isobutylene polymer block, at an (A)/(B) weight ratio within a range of 95/5 to 50/50.

2. A resin composition according to claim 1, wherein the (A)/(B) weight ratio is within a range of 90/10 to 60/40.

3. A resin composition according to claim 1, wherein the amorphous polyolefin resin (A) is an addition copolymer, comprising both of ethylene monomer and a cyclic olefin monomer or comprising both of the monomers and an α-olefin.

4. A resin composition according to claim 1, wherein the amorphous polyolefin resin (A) is a polymer prepared by ring-opening polymerization of a cyclic olefin and subsequent hydrogenation.

5. A resin composition according to claim 1, having a Haze value of 20 or less when the resin composition is prepared into sheet by compression molding.

6. A molded article comprising a resin composition according to claim 1.

* * * * *